(12) United States Patent
Soegaard

(10) Patent No.: US 9,671,514 B2
(45) Date of Patent: Jun. 6, 2017

(54) APPARATUS FOR POSITIONING OF SEISMIC EQUIPMENT TOWED BY A SURVEY VESSEL

(71) Applicant: Seismisk IQ Bird ApS, Haderslev (DK)

(72) Inventor: Soeren Peter Soegaard, Haderslev (DK)

(73) Assignee: SEISMISK IQ BIRD APS, Haderslev (DK)

(*) Notice: Subject to any disclaimer, the term of this patent is extended or adjusted under 35 U.S.C. 154(b) by 0 days.

(21) Appl. No.: 14/527,259

(22) Filed: Oct. 29, 2014

(65) Prior Publication Data

US 2015/0362613 A1     Dec. 17, 2015

(30) Foreign Application Priority Data

Jun. 11, 2014  (DK) ................................ 2014 70347

(51) Int. Cl.
*B63G 8/14* (2006.01)
*B63G 8/18* (2006.01)
*G01V 1/38* (2006.01)

(52) U.S. Cl.
CPC ................................ *G01V 1/3826* (2013.01)

(58) Field of Classification Search
CPC .. G01V 1/3835; G01V 1/3843; G01V 1/3826; G01V 1/3817; B63B 21/66
USPC ................................ 114/244, 245, 246, 247
See application file for complete search history.

(56) References Cited

U.S. PATENT DOCUMENTS

| | | | |
|---|---|---|---|
| 5,443,027 A | | 8/1995 | Owsley et al. |
| 5,532,975 A | * | 7/1996 | Elholm ................ G01V 1/3826 114/244 |
| 6,011,752 A | | 1/2000 | Ambs et al. |
| 6,144,342 A | | 11/2000 | Bertheas et al. |
| 6,671,223 B2 | | 12/2003 | Bittleston |
| 2008/0008033 A1 | * | 1/2008 | Fossum ................ G01V 1/3826 367/16 |

FOREIGN PATENT DOCUMENTS

FR        2744870 A1 *   8/1997    ........... G01V 1/3826

* cited by examiner

*Primary Examiner* — Anthony Wiest
(74) *Attorney, Agent, or Firm* — Merchant & Gould P.C.

(57) ABSTRACT

There is provided an apparatus for positioning in water of seismic equipment towed by a survey vessel. The apparatus is made of an elongated body part for receiving a towed underwater cable. The body part is provided with wings and integrated wing flaps for stably holding the apparatus in the correct water position.

8 Claims, 2 Drawing Sheets

APPARATUS FOR POSITIONING OF SEISMIC EQUIPMENT TOWED BY A SURVEY VESSEL

This application claims benefit of Ser. No. PA 2014 70347, filed 11 Jun. 2014 in Denmark and which application is incorporated herein by reference. To the extent appropriate, a claim of priority is made to the above disclosed application.

FIELD OF THE INVENTION

The present invention relates to an apparatus for positioning of seismic equipment towed by a survey vessel.

BACKGROUND OF THE INVENTION

A marine seismic streamer is an elongate cable-like structure, typically up to several thousand meters long, which contains arrays of hydrophones and associated electronic equipment along its length, and which is used in marine seismic surveying. In order to perform a 3D (as well as 2D or 4D) marine seismic survey, a plurality of such streamers is towed at about 5 knots behind a seismic survey vessel, which also tows one or more seismic sources, typically air guns. Acoustic signals produced by the seismic sources are directed down through the water into the seabed, where they are reflected. The reflected signals are received by the hydrophones, and then digitized and processed to build up a representation of the area being surveyed.

The streamers are typically towed at a constant angle relatively to the ship, in order to facilitate the removal of undesired "ghost" reflections from the surface of the water. To keep the streamers at this constant depth, control devices known as "birds", attached to each streamer at intervals of 100 to 300 meters, are used.

Current designs of birds comprise a relatively heavy body which is suspended beneath the streamer, and which has a pair of laterally projecting wings (hence the name "bird"), one on each side. The combination of streamer and birds is arranged to be neutrally buoyant, and the angle of attack of both wings is adjusted from time to time to control the depth of the streamer.

During a seismic survey, the streamers are intended to remain straight parallel to each other and equally spaced. However, after deploying the streamers, it is typically necessary for the vessel to cruise in a straight line for at least three streamer lengths before the streamer distribution approximates this ideal arrangement and the survey can begin. This increases the time taken to carry out the survey, and therefore increases the cost of the survey. However, because of sea currents, the streamers frequently fail to accurately follow the path of the seismic survey vessel, sometimes deviating from this path. This can adversely affect the coverage of the survey, frequently requiring that certain parts of the survey be repeated.

U.S. Pat. No. 5,443,027 describes a lateral force device for displacing a towed underwater acoustic cable, providing displacement in the horizontal and vertical directions, the device having a spool and a rotationally mounted winged fuselage.

U.S. Pat. No. 6,011,752 describes a seismic streamer position control having a body with a first end and a second end and a bore therethrough from the first end to the second end for receiving a seismic streamer therethrough, at least one control surface, the at least one recess in which is initially disposed the at least one control surface movably connected to the body for movement from and into the at least one recess and for movement, when extended from the body, for attitude adjustment.

U.S. Pat. No. 6,144,342 describes a method for controlling the navigation of a towed linear acoustic antenna. Birds equipped with variable-incidence wings are fixed onto the antenna. Through a differential action, the wings allow the birds to be turned about the longitudinal axis of the antenna so that a hydrodynamic force oriented in any given direction about the longitudinal axis of the antenna is obtained. The bird can be detached automatically as the antenna is raised so that the antenna can be wound freely onto a drum. This method also allows full control of the deformation, immersion and heading of the antenna.

U.S. Pat. No. 6,671,223 describes a control device or "bird" for controlling the position of a marine seismic streamer, which is provided with an elongate, partly flexible body which is designed to be electrically and mechanical connected in series with a streamer. In a preferred form the bird has two opposed wings which are independently controllable in order to control the streamers lateral position as well as depth.

Birds in accordance with these current designs suffer from a number of disadvantages. Because the birds (in some of the patents mentioned above) hang beneath the streamer, they produce considerable noise as they are towed through the water. This noise interferes with the reflected signals detected by the hydrophones in the streamers. Some of the birds comprise a pair of wings or rudders mounted on a rotatable structure surrounding the seismic steamer in order to generate lift force in a specified direction. This is an expensive and relatively complex electro-mechanical construction that is highly vulnerable in underwater operations. This also adds complexity to the local control loop, and also slows down the response time of the overall streamer positioning control system.

There is a need to provide a bird, which facilitates the combination of precise positioning of the streamer spread and the ability to steer individual streamers both in shape and position relative to other streamers. There is also a need to provide a control device which allows faster course change operations and shorter run-ins after line-turns than current designs.

SUMMARY OF THE INVENTION

The present inventor has surprisingly found that integrating flaps in wing of such a "bird" structure as well as providing the wings with winglets (known from aeronautics) results in a very stable position of the bird when pulled through the water. Moreover, the winglets have demonstrated that dirt, sea wheat and other debris, which often hampers the use of birds, is efficiently released from the wings of the bird.

Thus, in accordance with the present invention there is provided an apparatus for positioning of seismic equipment towed by a survey vessel, which apparatus comprises:

an elongated body part having an outer surface disposed about a longitudinal axis, the elongated body part suitable for being connected axially in line with a towed underwater cable, said body part having a front end and a rear end, wherein means, such as a hole, is provided along the axis between the front end and rear end of the body part for receiving the towed underwater cable;

at least three wings fixedly attached to the body part, said wings having a front side and a rear side, the wings being axially in line with a towed underwater cable for controlling the position of the apparatus in the water, said wings arranged around the circumference of the body part in angles of 110-140 degrees;

communication means for communication between the apparatus and the survey vessel;

wherein the wings are provided with wing flaps in the rear side of the wing so that the wing flaps constitute a part of the rear side of the wing, said flaps being rotatable around a wing axis by actuators or servo motors, thus the flaps act as rudders.

In a preferred embodiment of the present invention the tips of the wings are provided with winglets for further stabilizing the apparatus in the water. In a particularly preferred embodiment the winglets are arranged perpendicularly to the wings, where the upper wings are provided with upwardly oriented winglets, whereas the lower wing is provided with double winglets pointing to the sides of the bird as shown in FIG. 1. In this way the "bird" is held in a very stable position in the water.

In a particularly preferred embodiment the wing flap(s) have a length of 50-95%, preferably 70-90%, of the length of the rear part of the wings in which they are integrated. Preferably the area of a flap constitutes between 15 and 40% of the respective wing. Preferably, the wing flaps are secured to the wings via shafts in the end of the flaps, said shafts being connected to actuators for rotating the flaps.

In a particularly preferred embodiment of the present invention three wings are placed equidistantly along the circumference of the body part.

DETAILED DESCRIPTION OF THE DRAWING

Figure 1:
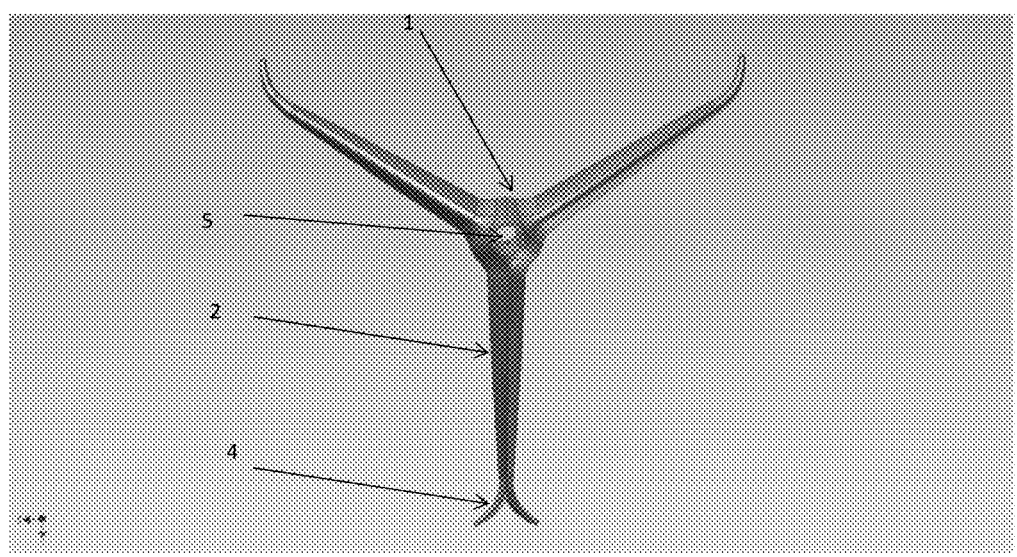
FIG. 1 is a schematic representation of a preferred embodiment of a streamer control device in accordance with the present invention.
Figure 2:
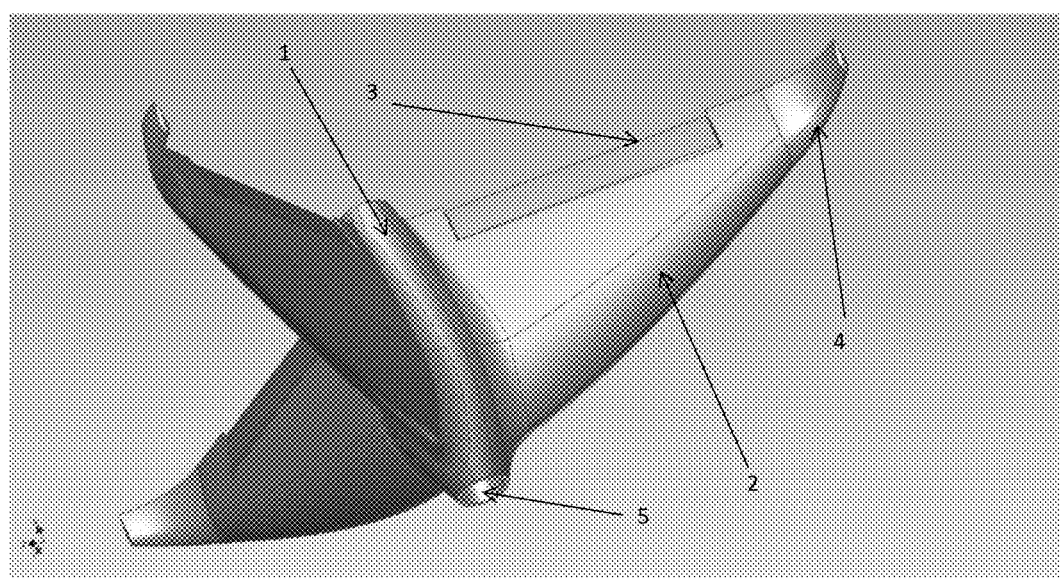
FIG. 2 is a representation of the FIG. 1 taken from another angle.

The streamer control device, or "bird", of FIG. 1 and FIG. 2, comprises an elongate streamlined body (1) adapted, to be mechanically and electrically connected in series in a multi-section marine seismic streamer of the kind which is towed by a seismic survey vessel and which is used in, in conjunction with a seismic source also towed by the vessel, to conduct seismic surveys, as briefly described above.

The bird is provided with three equidistantly distributed wings (2) that are typically molded from a fiber-reinforced plastics material together with the body (1). The wings (2) are fixedly attached to the body part (and preferably forming an integral part thereof), wherein the chord line of each wing (2) follows the axis between the front end and rear end of the body part, and a flap (3) in the outer edge of each wing for controlling the position of the apparatus in the water, said wings arranged around the circumference of the body part in angles of 80-140 degrees, said wings provided with winglets (4) for further stabilizing the apparatus in the water.

Rotation of the flaps (3) is effected under the control of a control system sealingly housed within the body. The wings (2) are generally rounded and swept back with respect to the direction of the bird in order to reduce the possibility of debris becoming hooked on them. This is further improved by the winglets (4) extending from the wing tips. There is also shown a hole (5) provided in the body part (1) for receiving the towed underwater cable.

The invention claimed is:

1. An apparatus for positioning seismic equipment in water, towed by a survey vessel, wherein the apparatus comprises:

an elongated body comprising a front end and a rear end and a longitudinal axis extending from the front end to the rear end, and an outer surface comprising a circular circumference disposed about the longitudinal axis, the elongated body constructed to be connected axially in line with a towed underwater cable, the elongated body comprising a hole extending along the axis through the elongated body from the front end to the rear end of the elongated body for receiving the towed underwater cable; and three wings comprising two upper wings and one lower wing, fixedly attached in a non-rotatable manner to the elongated body, said wings having a front side and a rear side and a chord line extending from the front side to the rear side, the chord line being parallel to the axis of the elongated body for controlling the position of the apparatus in the water, said wings arranged around the circumference of the elongated body at angles of 110-140 degrees between the wings;

wherein each of the wings comprises a wing flap extending rearwardly at the rear side of the wing so that the wing flap constitutes a part of the rear side of the wing, said wing flap being rotatable, wherein each of the wings comprises a tip, and wherein the tip of each of the upper wings includes a single winglet with a tip constructed to extend upwardly in a vertical direction, and wherein the tip of the lower wing comprises two winglets constructed to extend laterally away from the chord line of the lower wing.

2. Apparatus according to claim 1, wherein each wing comprises a surface area, and wherein each wing flap comprises 15-40% of the surface area of the wing onto which the flap is attached.

3. Apparatus according to claim 1, wherein the rear side of each wing has a length and wherein the wing flaps have a length 50-95% of the length of the rear side of the wing in which they are integrated.

4. Apparatus according to claim 1, wherein the wings are placed equidistantly along the circumference of the elongated body.

5. Apparatus according to claim 1, wherein the elongated body and flaps are made from a plastic composite material.

6. Apparatus according to claim 1, wherein the three wings are placed at angles of 120 degrees from each other along the circumference of the elongated body.

7. The apparatus of claim 1 comprising a rounded transition between each wing surface and the elongated body.

8. The apparatus of claim 1, wherein the elongated body and flaps are made from fiberglass.

* * * * *